United States Patent [19]

Groves

[11] 4,197,887

[45] Apr. 15, 1980

[54] ROUTER GUIDE ASSEMBLY

[76] Inventor: Gerald T. Groves, 11615 South 1300 West, Salt Lake City, Utah 84065

[21] Appl. No.: 843,765

[22] Filed: Oct. 20, 1977

[51] Int. Cl.² .............................................. B27C 5/10
[52] U.S. Cl. .............................. 144/136 C; 33/32 B; 33/42; 33/191; 144/134 D
[58] Field of Search ................. 144/27, 134 R, 134 A, 144/136 R, 136 C, 134 D, 117 C; 33/191, 42, 32 B, 41 B, 41 D; 90/12 D, DIG. 3; 145/4, 4.2, 6, 7, 10, 20

[56] References Cited

U.S. PATENT DOCUMENTS

| 739,297 | 6/1905 | Hesley | 145/10 |
|---|---|---|---|
| 1,166,968 | 1/1916 | Carter | 33/191 |
| 2,090,183 | 8/1937 | Capstick | 33/32 B |
| 2,609,018 | 9/1952 | Bjorklund | 144/134 D |
| 2,623,557 | 12/1952 | Kendall | 144/134 D |
| 3,137,947 | 6/1964 | Flower | 33/191 |
| 3,164,932 | 1/1965 | Morith | 144/117 C X |
| 3,292,263 | 12/1966 | Barry et al. | 33/32 B |

Primary Examiner—Robert Louis Spruill
Assistant Examiner—W. D. Bray
Attorney, Agent, or Firm—H. Ross Workman; J. Winslow Young

[57] ABSTRACT

A router guide assembly adapted to be releasably or semipermanently attached to the work face of a router. The router guide assembly includes a circular base plate having a central aperture through which the cutting bit of the router extends. A pair of guide posts may be adjustably mounted to the base plate on each side of the cutting bit perpendicularly to the base plate and are laterally adjustable relative to the cutting bit. The guide posts may also be removed from the base plate so that the base plate can serve as the work face of the router.

5 Claims, 3 Drawing Figures

ROUTER GUIDE ASSEMBLY

BACKGROUND

1. Field of the Invention

This invention relates to an attachment for a router and, more particularly, to a router guide assembly and method which adapts a router for forming a cut parallel to an edge of a work piece.

2. The Prior Art

The conventional router is a high speed, hand-portable, electrically driven cutting tool useful for numerous woodworking or similar projects. The interchangability of cutting bits and hand portability readily adapts the router for numerous cutting projects including for example, cutting (1) intricate shapes, (2) scrollwork, (3) dado cuts, (4) mitering and the like. The depth of the cut produced by the router may also be controlled by adjusting the distance the cutting bit extends from the work face of the router. The router work face is pressed against the workpiece so as to obtain a uniform cutting depth.

The edge of the work face is circular and is concentric with the cutting bit. The edge of the work face, therefore, may be moved along a straight edge or guide for the purpose of forming a cut parallel to the guide which must be clamped to the workpiece at a distance corresponding to the distance between the edge of the circular work face and the cutting bit. The cutting bit thereby forms a cut in the workpiece corresponding to the contour provided by the edge of the guide. However, since the guide must be clamped directly to the workpiece at a distance corresponding approximately to the radius of the work face of the router, it is not possible to use this prior art technique for forming a mortise or the like in the edge of a door or similar narrow workpiece.

Numerous prior art devices are provided for forming a mortise in the edge of a workpiece and include U.S. Pat. Nos. 481,383; 931,552; 1,904,109; 3,087,520; 3,150,452; 3,392,762; 3,450,001; 3,559,704; and 3,612,118. Additionally, U.S. Pat. No. 3,099,299 discloses a guide attachment for a router wherein a vertical post is secured to the router so as to be coaxial with the cutting bit. The vertical post serves as a guide in cooperation with a template to cause the router to form a cut corresponding to the template. Other devices set forth in the foregoing patents relate to numerous types of jigs, guides and workholders useful in combination with a router or the like. However, a jig apparatus is generally expensive and limited as to the types of cuts that can be performed using the jig. Additionally, other attachments requiring securement to the work face of a router substantially restrict the router to performing a single type of cutting operation thereby greatly restricting the utility of the router.

In view of the foregoing, it would, therefore, be an advancement in the art to provide an attachable cutting guide assembly for a router which may be releasably attached to the work face of a router to readily adapt the router for forming a cut parallel to at least one edge of the workpiece. It would also be advantageous to provide a cutting guide apparatus and method whereby a router may be provided with a cutting guide assembly which accommodates being semipermanently mounted to the work face of a router and includes guide posts removably mounted thereto. Another advancement would be to provide a cutting guide assembly which accommodates router centering adjustment without removal of the cutting guide assembly from the router. Such an apparatus and method is disclosed in the present invention.

BRIEF SUMMARY AND OBJECTS OF THE INVENTION

The present invention relates to a router guide assembly and method wherein a circular base plate is adapted to be semipermanently or releasably attached to the work face of a router. The base plate includes a pair of guide posts extending perpendicularly from the base plate. The guide posts are radially adjustable on either side of the cutting bit and are adapted to engage the edge of a workpiece thereby guiding the cutting bit parallel to at least one edge of the workpiece. The guide posts are each selectively adjustable relative to the center of the base plate and, correspondingly, the cutting bit so as to adapt the router guide assembly of this invention for forming cuts in workpieces having different thicknesses. The guide posts may also be removed from the base plate so that the base plate may now be used as the work face of the router.

It is, therefore, a primary object of this invention to provide improvements in router guide assemblies.

Another object of this invention is to provide improvements in the method for adapting a router for forming a cut in a workpiece parallel to an edge of the workpiece.

Another object of this invention is to provide a router guide assembly for releasable or semipermanent attachment to the work face of a router.

Another object of this invention is to provide radially adjustable guide post assembly for a router guide assembly.

These and other objects and features of the present invention will become more fully apparent from the following description and appended claims taken in conjunction with the accompanying drawing.

DETAILED DESCRIPTION OF THE PREFERRED EMBODIMENTS

Figure 1:
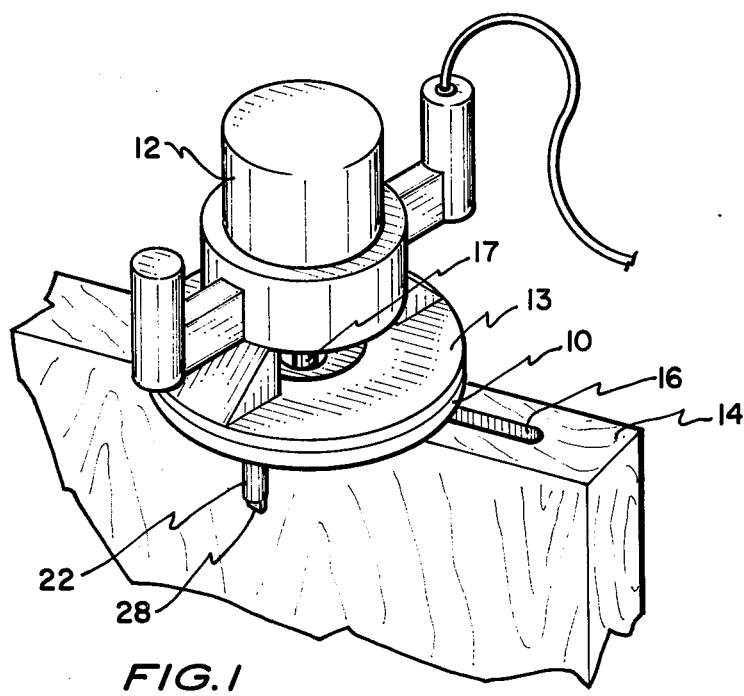
FIG. 1 is a perspective view of the router guide assembly of this invention shown in the environment of a router and a workpiece, portions of the workpiece being broken away for ease of illustration.

The invention is best understood by reference to the drawing wherein like parts are designated with like numerals throughout.

Referring now to the drawing, the cutting guide assembly of this invention is shown generally at 10 and includes a base plate 20 with a pair of guide posts 22 and 24 mounted thereon. Cutting guide assembly 10 is adapted to be releasably attached to a router 12 for the purpose of guiding a cutting bit 17 to form a cut 16 in the edge of a workpiece 14. Router 12 is illustrated schematically in FIG. 1 since it is specifically understood that router 12 may be any suitable model of router. Additionally, base plate 20 is configured to be mounted to the work face 13 of various model routers as will be set forth more fully hereinafter.

Figure 2:
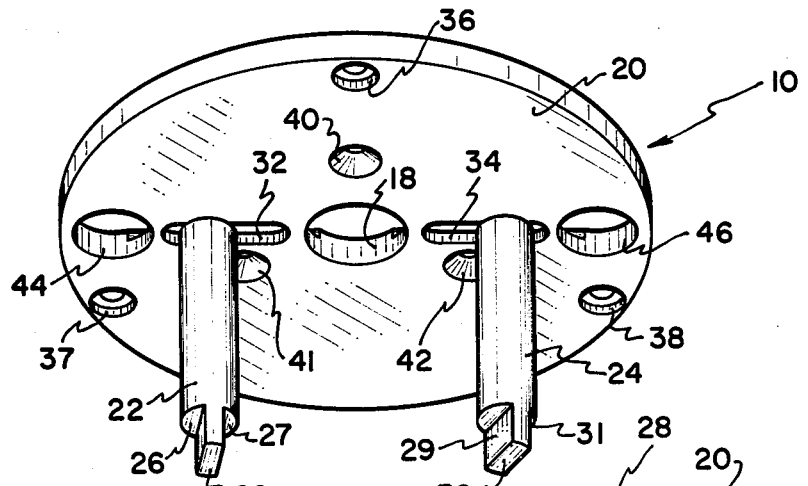
FIG. 2 is a perspective view of the guide posts and base plate of the router guide assembly of this invention.
Figure 3:
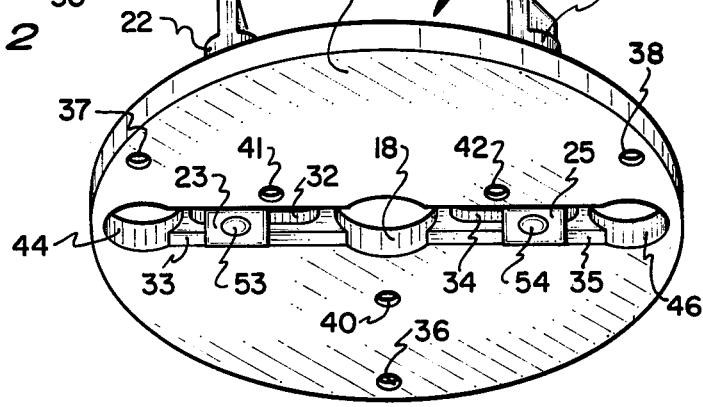
FIG. 3 is a reverse view of the router guide assembly of FIG. 2.

Referring now more specifically to FIGS. 2 and 3, the base plate 20 is configured as a circular plate having an aperture 18 in the center thereof. Base plate 20 is circular and is, therefore, adapted to be concentric with the circular work face 13 of router 12 (FIG. 1). The work face 13 is conventional and may be of any desirable configuration, or omitted on some router types. Cutting bit 17 extends downwardly through the centers of both work face 13 and base plate 20 so that cutting bit 17 is coaxial with the axis of each. This configuration of base plate 20 allows base plate 20 to be semipermanently mounted to work face 13 and thereby serve as the semipermanent work face of router 12.

Aperture 18 is configured as the opening through which cutting bit 17 (FIG. 1) extends beyond base plate 20. The preselected distance that cutting bit 17 extends beyond base plate 20 is selectively predetermined as a function of the depth of cut 16 (FIG. 1).

A pair of radially oriented, diametrically opposed guide slots 32 and 34 on either side of aperture 18 serve as engagement means for the guide posts 22 and 24, respectively. In particular, each of guide posts 22 and 24 are configured with a reduced diameter, threaded bolt, bolts 53 and 54 (FIG. 3), respectively. Bolts 53 and 54 are threadedly engaged by nuts 23 and 25 (FIG. 3), respectively, thereby adapting the respective guide posts 22 and 24 to be securely engaged with the respective guide slots 32 and 34 in base plate 20.

Guide slots 32 and 34 are specifically formed along a diameter of base plate 20 so that any lateral movement of either guide posts 22 or 24 will be radial with respect to cutting bit 17. Additionally, guide slots 32 and 34 may each include a plurality of indicia (not shown) along the length thereof for the purpose of assisting the operator (not shown) in suitably adjusting guide posts 22 and 24 with respect to guide slots 32 and 34, respectively, but more particularly with respect to cutting bit 17.

Nuts 23 and 25 are received in grooves 33 and 35, respectively, where they are held against rotation and loss when guide posts 22 and 24, respectively, are removed, loosened, or tightened as will be set forth more fully hereinafter. Additionally, grooves 33 and 35 permit nuts 23 and 25, respectively, to be moved radially corresponding to the radial adjustment of guide posts 22 and 24, respectively, with respect to cutting bit 17. The depth of grooves 33 and 35 as well as the thickness of nuts 23 and 25 is selectively coordinated so that nuts 23 and 25 are flush with the back surface of base plate 20.

Tightening and loosening of guide posts 22 and 24 with respect to nuts 23 and 25, respectively, is accomplished by means of bolt heads 28 and 30, respectively. Bolt heads 28 and 30 are fabricated as extensions of guide posts 22 and 24, respectively. Cutouts 26 and 27 on each side of bolt head 28 form bolt head 28 from the end of guide post 22. Correspondingly, cutouts 29 and 31 form bolt head 30 at the end of guide post 24. The particular configuration illustrated herein for bolt heads 28 and 30 is particularly advantageous since bolt heads 28 and 30 do not extend beyond the peripheral configuration of guide posts 22 and 24, respectively, while simultaneously providing a gripping surface for a wrench (not shown) or the like. Alternatively, bolt heads 28 and 30 could be configured as coaxially recessed wrench engagement means similar to conventional hexagonal wrench receptacles.

Included within base plate 20 are a pair of access apertures 44 and 46 which expose adjustment screws (not shown) on router 12. Access apertures 44 and 46 are, therefore, not a part of the present invention although they do contribute significantly to the utility of the cutting guide assembly 10 of this invention by making it more readily usable on a router 12 as a semipermanent fixture. This feature is particularly useful since it allows the operator (not shown) to leave base plate 13. semipermanently attached to router 12 while retaining the ability to suitably adjust router 12 through access apertures 44 and 46.

Base plate 20 is releasably or semipermanently attached to the work face 13 of router 12 by means of a plurality of aperture sets 36-38 or 40-42. Aperture sets 36-38 and 40-42 are each independent of the other and are included herein for the purpose of specifically illustrating that the base plate 20 may be suitably attached to at least two different models of router 12. For example, if aperture set 40-42 is used to secure base plate 20 to work face 13, aperture set 36-38 is not utilized but remains as openings in base plate 20 without interfering in any manner with the operation of router 12. Accordingly, aperture set 36-38 remains unused and is merely openings in base plate 20 substantially similar to access apertures 44 and 46.

It should also be noted that each each of aperture sets 40-42 and 36-38 are shown as different types of recessed apertures which accommodate receipt of a countersunk screw or a bolt head, respectively, therein and in a recessed relationship with the workface of base plate 20.

THE METHOD

The method of this invention readily adapts a conventional router to use with the cutting guide assembly of this invention. In particular, most routers, regardless of the manufacturer or model, generally include a circular work face 13 having a standard diameter. Additionally, the work face 13 for the various types of routers includes a plurality of mounting apertures therein, generally three equidistantly spaced bolt- or screw-receiving holes. Accordingly, the base plate 20 of the cutting guide assembly 10 is chosen with a corresponding or slightly larger diameter than work face 13 and is suitably mounted thereto by means of aperture sets 36-38 or 40-42. Thus mounted, apertures 44 and 46 are superimposed over corresponding apertures (not shown) in work face 13. Until guide posts 22 and 24 are mounted to base plate 20, base plate 20 is substantially a duplicate of work face 13 thereby accommodating the use of base plate in place of work face 13.

Guide posts 22 and 24 are selectively mounted to base plate 20 by means of bolt heads 53 and 54, respectively, being screwed into nuts 23 and 25 (FIG. 3), respectively. It should be noted that, where desired, only one of guide posts 22 or 24 may be secured to base plate 20 when the inclusion of the other guide post would interfere with the cutting operation. For example, assuming workpiece 14 were substantially thicker than shown, it would be possible to completely eliminate guide post 24 and merely use guide post 22 as a means for directing cutting bit 17 parallel to the edge of workpiece 14. However, it is currently preferred to utilize both of guide posts 22 and 24 to securely bracket workpiece 14 to thereby substantially minimize the tendency for cutting bit 17 to pivot about a single guide post such as guide post 22 as set forth hereinbefore.

Thus configured, router 12 may be readily adapted to form a mortise, dado or the like in the edge of a workpiece by the simple expedient of adjusting cutting bit 17 so that it extends the desirable depth to prepare the cut 16 and thereafter, mounting guide posts 22 and 24 to base plate 20. Guide posts 22 and 24 are radially adjusted relative to cutting bit 17 to suitably guide cutting bit 17 parallel to the edges of workpiece 14 at a preselected distance. Thereafter, guide posts 22 and 24 are bracketed over the edge of workpiece 14 with the face of base plate 20 in juxtaposition against workpiece 14. The operator (not shown) moves router 12 along the edge of workpiece 14 forming cut 16 therein the preselected distance. Cut 16 may be widened by readjusting the relationship between guide posts 22 and 24 with cutting bit 17 and repeating the foregoing cutting operation.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

I claim:

1. A cutting guide assembly for a router having a work face and a cutting bit extending from the work face comprising:
    a base plate comprising:
        a centrally located aperture for the cutting bit;
        a pair of diametrically opposed guide slots through the base plate extending radially on each side of the aperture; and
        mounting means for releasably attaching the base plate to the work face of the router with the cutting bit extending through the aperture; and
    a pair of cylindrical guide posts adapted to be adjustably mounted in the guide slots and extending perpendicularly from the base plate, each guide post including a wrench engagement means on the end to accomodate adjustably mounting the guide posts to the base plate, the wrench engagement means comprising a wrench gripping surface inside the external peripheral configuration of the guide post.

2. The cutting guide assembly defined in claim 1 wherein the base plate comprises a circular disc and the aperture is located at the center of the disk.

3. The cutting guide assembly defined in claim 1 wherein the guide slots are each formed in the bottom of a widened groove, the widened grooves opening toward the back of the base plate and each receiving a nut in recessed relationship therewith to accommodate adjustably mounting the guide posts to the base plate while retaining the nuts against rotation and loss.

4. The cutting guide assembly defined in claim 3 wherein the nuts are received in the widened groove flush with the back of the base plate and the widened groove acts as a holding means for holding the nuts against turning when the guide posts are rotated when a wrench is applied to the wrench engagement means on the guide posts.

5. A cutting guide assembly for a router having a work face and a cutting bit extending from the work face comprising:
    a circular base plate comprising:
        an aperture for the cutting bit in the center of the base plate;
        a pair of guide slots cut through the base plate, the guide slots being radially oriented on opposite sides of the aperture, each guide slot having a recessed groove on a back face of the base plate, each recessed groove receiving a nut recessed from the back face of the base plate; and
        mounting means for releasably attaching the base plate to the work face of the router; and
    a pair of guide posts adapted to be adjustably secured to the base plate at a first end by the nuts, the guide posts accommodating adjustment in a plurality of positions in the guide slots, the guide posts each having a wrench engagement site at a second end to receive a wrench to accommodate being tightened to the base plate in a secure relationship and also loosened for adjustment relative to the guide slots.

* * * * *